United States Patent [19]

Chiu

[11] Patent Number: 5,255,490
[45] Date of Patent: Oct. 26, 1993

[54] SEALING AND DELIVERY DEVICE FOR DOUBLE-LAYERED CARTON SEALING MACHINE

[76] Inventor: Shao-Fa Chiu, No. 96, Ming Her Li, Ta Lin Chen, Chiayi Hsien, Taiwan

[21] Appl. No.: 942,849

[22] Filed: Sep. 10, 1992

[51] Int. Cl.⁵ .......................... B65B 7/20; B65B 7/28; B65B 59/02
[52] U.S. Cl. ................................ 53/136.4; 53/377.2; 53/368
[58] Field of Search ............. 53/376.4, 377.2, 136 A, 53/368, 169

[56] References Cited

U.S. PATENT DOCUMENTS

| | | | |
|---|---|---|---|
| 3,355,855 | 12/1967 | Loveland et al. | 53/136.4 X |
| 3,587,209 | 6/1971 | Arentz | 53/377.2 X |
| 3,775,937 | 12/1973 | Devan et al. | 53/136.4 X |
| 4,010,597 | 3/1977 | Nelson | 53/377.2 X |
| 4,041,675 | 8/1977 | Loveland et al. | 53/377.2 X |
| 4,658,563 | 4/1987 | Lissoni | 53/136.4 |
| 4,748,794 | 6/1988 | Marchetti | 53/136.4 |

Primary Examiner—Horace M. Culver
Attorney, Agent, or Firm—Bacon & Thomas

[57] ABSTRACT

A sealing and delivery device particularly adapted for use in a double layered carton sealing machine which is made up of a delivery device, two carton lifting devices, a top folding device and a periphery sealing device. The delivery device can be slightly pivoted up and down and the two carton lifting devices Are responsible for lifting up the outer layer of a double layered carton for folding the top with the distance of the two lifting devices adjustable so as to permit cartons of different size to be fitted. The top folding device is used to fold the flaps of a carton into position and the height thereof can be varied so as to permit its use with cartons of different heights. The so structured double layered carton sealing machine can be applied to cartons of any size and be operated with safety without damage to the packed items inside a carton.

5 Claims, 5 Drawing Sheets

SEALING AND DELIVERY DEVICE FOR DOUBLE-LAYERED CARTON SEALING MACHINE

BACKGROUND OF THE INVENTION

The present invention relates to a sealing and delivery device particularly adapted for use in a double layered carton sealing machine which can be adapted to cartons of any size and make the packed items in a double layered carton better protected from being damaged as a result of violent operation in the sealing process by means of a double layered carton structure.

Generally speaking, the conventional sealing machines have been well designed and developed to such a degree that they all can be operated with high speed and accuracy. However, the prior art sealing machines carry out the sealing operations at such a high speed that the items or goods housed in the packed cartons can be easily damaged due to violent vibration or collision during the sealing process. It might frequently happen when items of fragile material are to be sealed in a general single layer carton, the items disposed at the top of the cartons are often damaged during the sealing operation; it is especially true when the packed cartons contain fruits that become easily spoiled at the end of the delivery as a result of minor damages in the packing process. A few spoiled fruits in a carton can make the whole collection thereof go bad, causing serious waste and loss of money.

SUMMARY OF THE INVENTION

Therefore, the primary object of the present invention is to provide a sealing machine which uses double layered cartons so as to better protect the items contained therein during the sealing operation. The outer box of a double layered carton can be lifted up first and then the top thereof can be folded separately from the inner box containing the packed items of fragile material so as to effectively protect the items from damage in the sealing operation.

Another object of the present invention is to provide a delivery device for a double layered sealing machine which can be slightly pivoted downward so as to stop a carton moving further forward to the carton sealing device as long as the proceeding carton is still occupying the carton sealing device so as to prevent the unsealed carton occupying the sealing device from being pushed off by a following carton.

One further object of the present invention is to provide a top folding device having a control crank arm for a double layered carton sealing machine, which can vary the height of the rocker arms of the top folding device so as to permit cartons of different sizes to be fitted therein.

One still further object of the present invention is to provide a carton lifting device having a pair of parallelly disposed lifting units that are movably mounted onto a pair of parallel screw rods so that the distance between the two lifting units can be varied to be adapted to cartons of different size by simply adjusting the screw rods.

DETAILED DESCRIPTION OF THE PREFERRED EMBODIMENT

Figure 1:
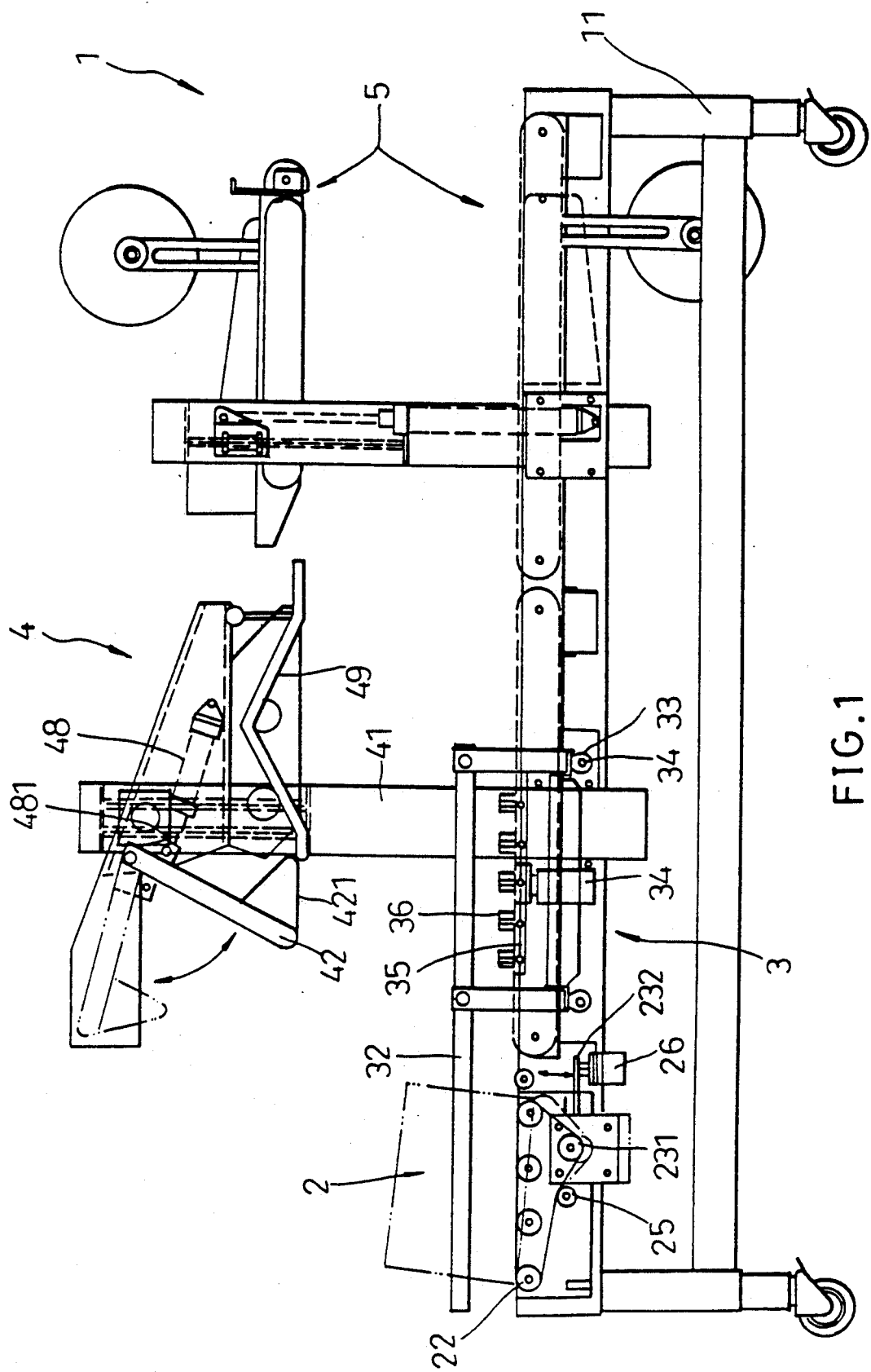
FIG. 1 is a side view showing the overall assembly of the double layered carton sealing machine of the present invention.

Referring to FIG. 1, the carton sealing machine 1 of the present invention is comprised of a platform 1 1 to which is mounted a delivery device 2, a carton lifting device 3, a top folding device 4 and a carton sealing device 5.

Figure 2A:
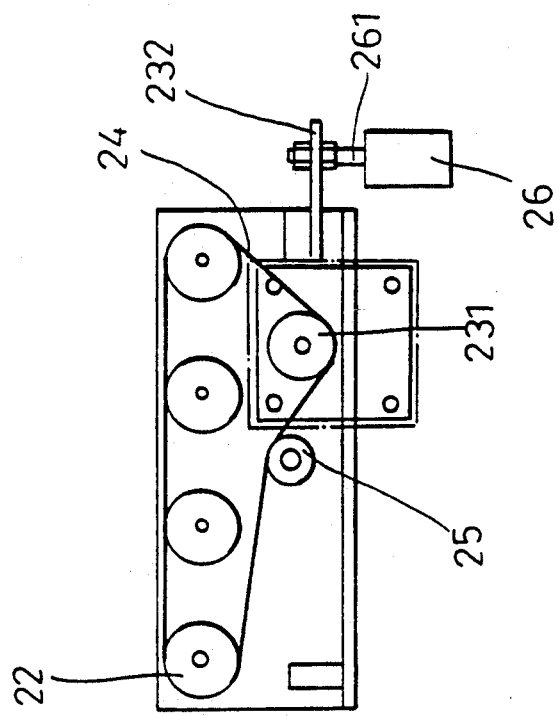
FIG. 2A is a sectional view of the delivery device thereof.
Figure 2:
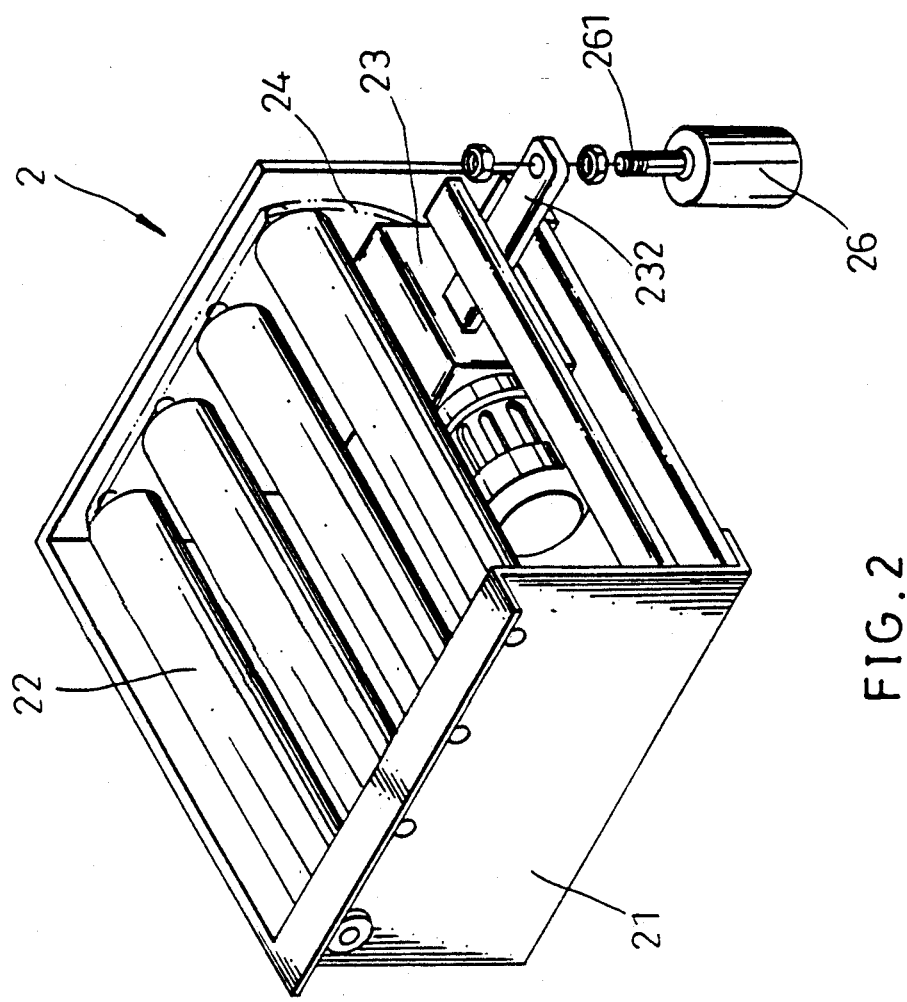
FIG. 2 is a perspective view of the pivotal delivery device of the present invention.
Figure 3:
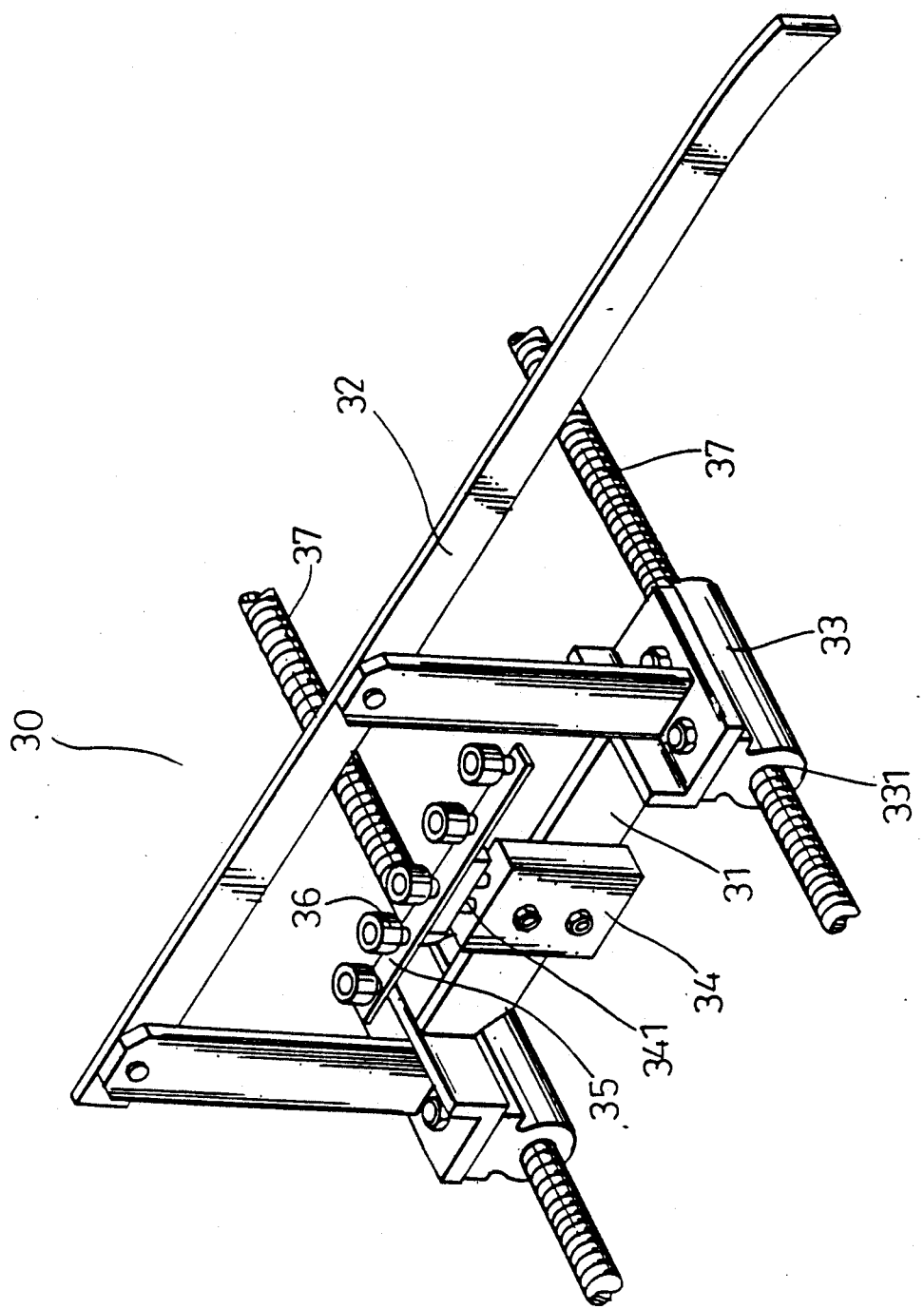
FIG. 3 is a perspective view showing the structure of a lifting unit of the lifting device of the present invention.

The delivery device 2, as shown in FIGS. 2, 3, is disposed at one end of the platform 1 1 at where cartons can be fed with ease into the sealing machine. There are a plurality of parallel rollers 22 secured to the open top of a case 21 in a consecutive manner. The outermost roller of the consecutive rollers 22 is secured to both the case 21 and the platform 1 1 with its protruding ends so as to permit the case 21 to be pivotally actuated. Under the consecutive rollers 22 and inside the case 21 is disposed a reducing motor 23 having a drive wheel attached thereto. A chain 24 is operatively engaged with the rollers 22 and an idle wheel 25 which is disposed adjacent to the motor 23.

As shown in FIGS. 2, 2A, to one side of the motor 23 is attached a horizontal protrusion rod 232. The end of the rod 232 is engaged with a first cylinder 26 by way of a cylinder rod 261 whereby the case 21 along with the delivery device 2 can be pivoted up and down with respect to the platform about the outermost roller thereof when the first cylinder 26 is accordingly actuated.

Referring to FIGS. 1, 3, the carton lifting device 3 is equipped with a pair of lifting units 30 each having an I-shaped mounting base 31. An F-shaped guide bracket 32 is attached to the mounting base 31 and the outermost end of the guide bracket 32 is bent slightly outwardly and extends all the way to the edge of the delivery device 2.

To each end of the mounting base 31 is attached a sliding seat 33 having a threaded through hole 331 disposed at the center thereof so as to permit a first screw rod 37 to operatively extend therethrough. At the center of the mounting base 31 is disposed a second cylinder 34. The two lifting units 30 are movably mounted onto the first screw rods 37 so that the distance therebetween can be adjusted for reception of cartons of different size by rotational adjustment of the first screw rods 37 in either direction. The second cylinder 34 disposed at the center of the mounting base 31 is associated with an elongated pushing board 35 by way of a cylinder rod 341. There are a number of spaced limiting rollers 36 disposed on the pushing board 35.

Figure 4:
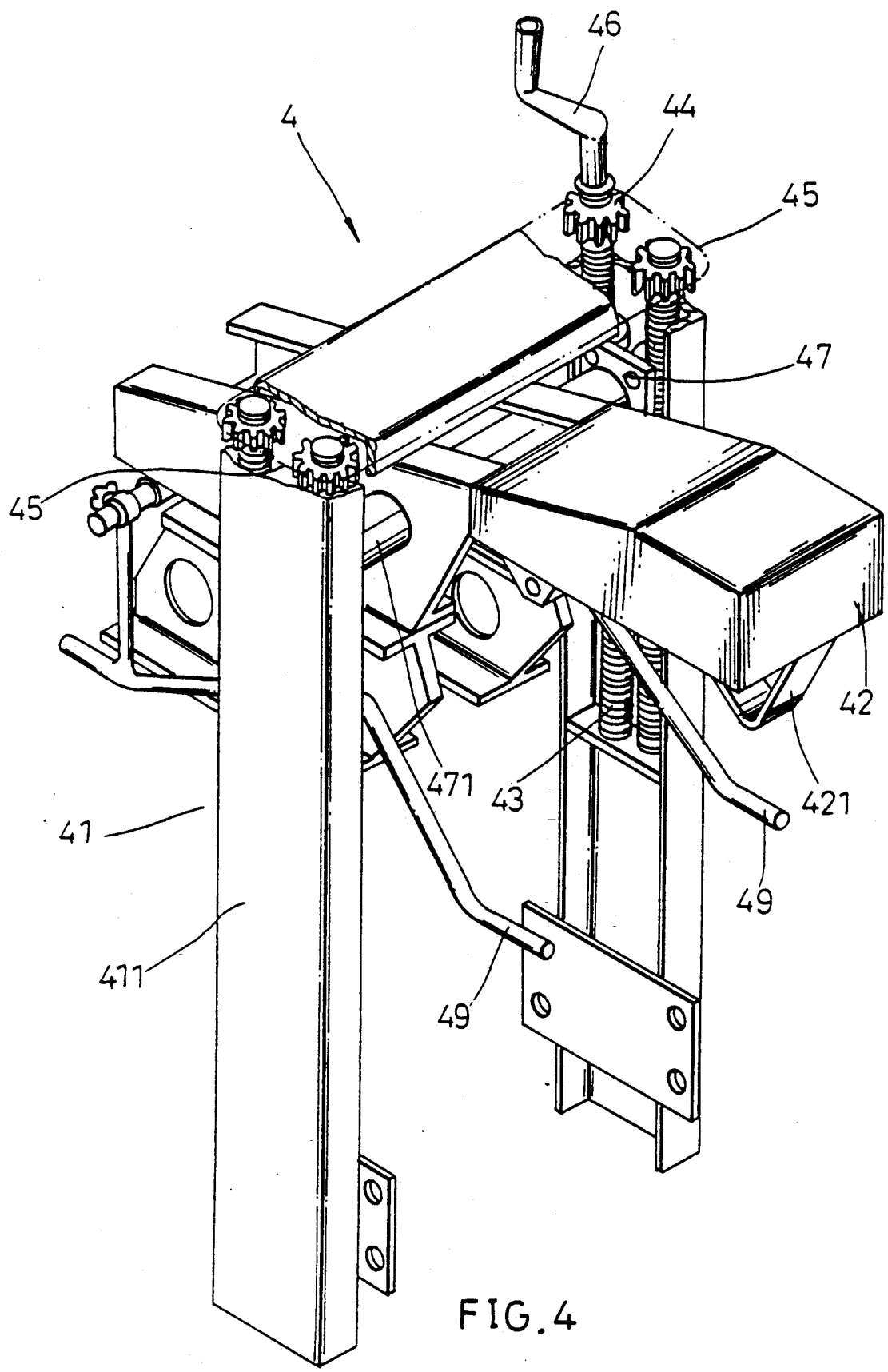
FIG. 4 is a perspective view of the top folding device of the present invention.

The top folding device 4, as shown in FIGS. 1, 4, is comprised of an inverted "U" shaped gate member 41, a pivotal rocker arm 42, and a pair of pressing rods 49. The gate member 41 has a pair of supporting legs 41 1 which are secured to the sides of the platform 1 1 and a pair of second screw rods 43 are disposed on the inner side of each supporting leg 41 1 near the upper portion thereof. Each second screw rod 43 is provided with a gear 44 at the top end thereof and a looped chain 45 is operationally engaged with the four gears 44. A crank arm 46 is connected to the top of one of the second screw rods 43. A movable bracket 47 has a pair of threaded holes disposed on one side thereof, permitting the second screw rods 43 to be engaged therewith. The brackets 47 are each engaged with the paired screw rods 43 and are connected to each other by way of a connection rod 471 to which is pivotally attached the rocker arm 42. A triangularly shaped pressing hand 421 is disposed at the free end of the rocker arm 42 and the rocker arm 42 is connected to a cylinder rod 481 of a third cylinder 48 at one end thereof. A pair of bent pressing rods 49 are secured to the top folding device 4 and each rod 49 extends a distance and is so structured that it can force the flaps of a carton to bend downwardly and be folded into position when passing through the top folding device 4.

Figure 5:
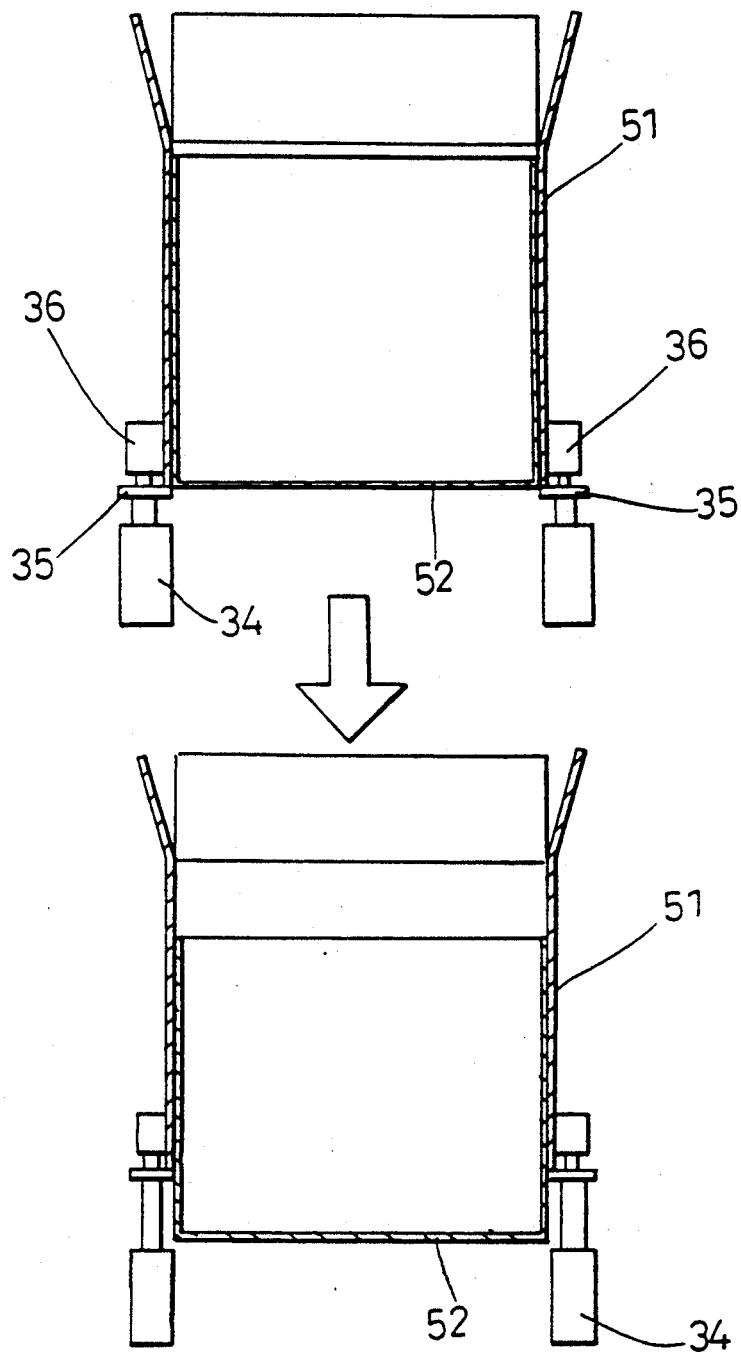
FIG. 5 is a diagram showing the outer box of a double layered carton being pushed upward in the sealing operation.

Referring to FIGS. 1, 5, a double layered carton having an outer box 51 and an inner box 52 may be fed into the sealing machine by way of the rollers 22 of the delivery device 2 and further to the carton lifting device 3. The cylinder rod 341 of the second cylinder 34 is actuated to urge the pushing board 35 to move upward so that the outer box of a double layered carton is lifted up, as shown in FIG. 5. In the mean time, the forward moving carton is in contact with the pivotal rocker arm 42 actuated by the cylinder rod 481 of the third cylinder 48 to swing up and down in such manner that the front and rear flap of a carton can be accordingly folded and the side flaps of the carton are actuated by the two pressing rod 49 to fold accordingly. The carton is then delivered to the carton sealing device 5 to complete the process.

The present invention is characterized in that when a carton is still being sealed, the next carton delivered by the delivery device 2 will be stopped as a result of the first cylinder 26 being actuated to pivot the delivery device 2 downwardly so that the carton is not able to move forwardly into the carton lifting device 3, as shown in FIG. 1 allowing the fed cartons can be spaced properly and be delivered in suitable order.

Moreover, the distance between the two carton lifting units 30 is able to be varied by moving the units along the first screw rods so that cartons of different size can be fitted therein. The rocker arm 42 of the top folding device 4 is pivotally disposed on a pair of brackets 47 that are engaged with two paired second screw rods 43 so that the height of the rocker arm 42 can be varied by the rotational operation of the second screw rods 43 by way of the actuation of the crank arm 46 so as to permit cartons of different sizes to be fitted therein.

It can be clearly seen that the present sealing machine can avoid accidental damage to the packed items in a double layered carton by lifting up the outer box thereof and sealing the same without contact with the inner box of the double layered carton. The flexible adjustment of the carton lifting device, the rocker arm of the top sealing device and the pivotal operation of the delivery device makes the present sealing machine operate in a more flexible, efficient and safe manner.

When the flaps of the lifted outer box have been folded properly for sealing by tape or thermal melting glue, the carton is delivered to a conventional carton sealing device 5 which is not described hereinbefore because it is well known in the art, where the lifted outer box is pushed down with care and the folded top of the carton is first sealed and the bottom of the double layered carton is then sealed tightly so that the inner and the outer boxes can be integrally assembled.

The use of a double layered carton to pack fragile items can avoid unnecessary waste or loss of money as a result of damage to the goods in the sealing process. The delivery device, the top folding device and the carton lifting device particularly adapted for the present double layered carton sealing machine can all work together in cooperation to effect the purpose as described hereinbefore.

I claim:

1. An improved carton sealing machine particularly adapted for sealing double layered cartons each having an outer box and an inner box, comprising:
   a) pivotally operated delivery means disposed at a front of the machine for controllably feeding cartons into said carton sealing machine;
   b) carton lifting means disposed adjacent to said pivotally operated delivery means to lift up the outer box of said double layered carton so as to facilitate a folding and sealing operation on foldable flaps of said outer box wherein said carton lifting means comprises;
      i) a pair of spaced apart carton lifting units movably mounted on a pair of screw rods such that the distance therebetween is adjustable so as to permit cartons of different sizes to be fitted therein;
      ii) each of said carton lifting units comprising a generally l-shaped mounting base on which is disposed a generally F-shaped guide bracket used to guide the fed cartons from said delivery means of the sealing machine and a cylinder actuated pushing board having a plurality of limiting rollers disposed thereon; and,
      iii) cylinder means operatively connected to said pushing board so as to be pushed upward by said cylinder means such that the outer box of said double layered carton can be lifted up by said pushing board;
   c) top folding means disposed adjacent to said carton lifting means to fold foldable flaps disposed at a top of said outer box so as to be ready for a sealing operation;
   d) carton sealing means to seal said outer carton of said double layered carton so as to make said double layered carton integrally and tightly sealed.

2. An improved sealing machine particularly adapted for sealing double layered cartons as claimed in claim 1 wherein said delivery means comprises:
   a) a case pivotally secured to an end of said machine, the case having a plurality of spaced rollers disposed on an open top thereof;
   b) cylinder means connected to said pivotal case so as to pivotally actuate said case so as to stop a supply of cartons from entering into said sealing machine by blocking the movement of said cartons when said case is pivoted downwardly; and,
   c) a reducing motor operatively associated with said rollers by way of endless drive means including an idle roller.

3. An improved sealing machine as claimed in claim 1 wherein said top folding means comprises;
   a) a generally inverted "U"-shaped gated member having a pair of supporting legs secured to said machine;

b) a pair of screw rods rotatably secured to each said supporting leg with each rod provided with a gear at a top end thereof that are operatively connected with each other by a looped chain;

c) a crank arm operatively associated with one of said screw rods for rotation of said screw rods simultaneously;

d) a bracket associated with each pair of screw rods and connected to each other by way of a connection rod whereby the actuation of said crank arm moves said brackets up and down for adjustment;

e) a rocker arm pivotally associated with said connection rod, having a front head which is provided with a triangularly shaped pressing hand that and adapted to be pivoted back and forth by a cylinder means so as to fold the flaps of said outer carton lifted up by said carton lifting means; and, f) a pair of pressing rods secured to said rocker arm so as to fold the flaps of said carton.

4. An improved carton sealing machine particularly adapted for sealing double layered cartons each having an outer box and an inner box, comprising:

a) pivotally operated delivery means disposed at a front of the machine for controllably feeding cartons into said carton sealing machine;

b) carton lifting means disposed adjacent to said pivotally operated delivery means to lift up the outer box of said double layered carton so as to facilitate a folding and sealing operation on foldable flaps of said outer box;

c) top folding means disposed adjacent to said carton lifting means to fold foldable flaps disposed at a top of said outer box so as to be ready for sealing operation, wherein said top folding means comprises:

i) a generally inverted "U"-shaped gate member having a pair of support legs secured to said machine;

ii) a pair of screw rods rotatably secured to each said supporting leg with each rod provided with a gear at a top end thereof that are operatively connected with each other by a looped chain;

iii) a crank arm operatively associated with one of said screw rods for rotation of said screw rods simultaneously;

iv) a bracket associated with each pair of screw rods and connected to each other by way of a connection rod whereby the actuation of said crank arm moves said brackets up and down for adjustment;

v) a rocker arm pivotally associated with said connection rod, having a front head which is provided with a triangularly shaped pressing hand and adapted to be pivoted back and forth by a cylinder means so as to fold the flaps of said outer carton lifted up by said carton lifting means; and, vi) a pair of pressing rods secured to said rocker arm so as to fold the flaps of said carton; and, d) carton sealing means to seal said outer carton of said double layered carton so as to make said double layered carton integrally and tightly sealed.

5. An improved sealing machine particularly adapted for sealing double layered cartons as claimed in claim 4 wherein said delivery means comprises:

a) a case pivotally secured to an end of said machine, the case having a plurality of spaced rollers disposed on an open top thereof;

b) cylinder means connected to said pivotal case so as to pivotally actuate said case so as to stop a supply of cartons from entering into said sealing machine by blocking the movement of said cartons when said case is pivoted downwardly; and, c) a reducing motor operatively associated with said rollers by way of endless drive means including an idle roller.

* * * * *